US012204684B2

(12) United States Patent
Watry et al.

(10) Patent No.: US 12,204,684 B2
(45) Date of Patent: Jan. 21, 2025

(54) PERMISSIONS WIZARD FOR IMMERSIVE CONTENT SHARING ECONOMY HUB

(71) Applicant: DYNEPIC, INC., Reno, NV (US)

(72) Inventors: Krissa Watry, Reno, NV (US); Stephen John Hopp, Miamisburg, OH (US); Christina Maria Kokini Padron, Oviedo, FL (US); Whitney Kempton, Tustin, CA (US); Catherine Cox, Santa Ana, CA (US); Muneeb Arain, Placenta, CA (US); Omur Koroglu, Rutherford, NJ (US); Adam Reiter, Damariscotta, ME (US); Frances Marie Schiesl, Madison, WI (US)

(73) Assignee: DYNEPIC, INC., Reno, NV (US)

( * ) Notice: Subject to any disclaimer, the term of this patent is extended or adjusted under 35 U.S.C. 154(b) by 118 days.

(21) Appl. No.: 17/831,610

(22) Filed: Jun. 3, 2022

(65) Prior Publication Data
US 2022/0391521 A1 Dec. 8, 2022

Related U.S. Application Data

(60) Provisional application No. 63/196,638, filed on Jun. 3, 2021.

(51) Int. Cl.
*G06F 21/62* (2013.01)
*G06F 21/31* (2013.01)

(52) U.S. Cl.
CPC .......... *G06F 21/629* (2013.01); *G06F 21/31* (2013.01); *G06F 21/6218* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 7,584,250 B1 * | 9/2009 | Chapman | G06Q 10/00 709/206 |
| 7,620,704 B2 * | 11/2009 | Soluk | H04L 63/105 709/220 |
| 8,930,331 B2 * | 1/2015 | McGrew | G06F 16/2329 707/695 |
| 9,832,441 B2 * | 11/2017 | Osman | G07F 17/3216 |

(Continued)

FOREIGN PATENT DOCUMENTS

| | | | |
|---|---|---|---|
| WO | 2014040179 A1 | 3/2014 | |
| WO | WO 2017085443 A1 * | 5/2017 | G06F 21/62 |

OTHER PUBLICATIONS

International Preliminary Report on Patentability for PCT/US2022/072746; Dec. 14, 2023; 11 pgs.

*Primary Examiner* — Backhean Tiv
(74) *Attorney, Agent, or Firm* — Shumaker, Loop & Kendrick, LLP; Patrick B. Horne

(57) ABSTRACT

Embodiments of the present invention disclose a permissions wizard for an immersive training sharing economy hub. A hub system, comprising a memory device operatively coupled to a processing device, where the processing device is configured to run a permissions wizard module and assign permissions and optionally security levels to a listing. The permissions wizard module implements a workflow based on the user type and applies a predetermined permissions map to provide a permissions recommendation for the listing.

19 Claims, 21 Drawing Sheets

(56) References Cited

U.S. PATENT DOCUMENTS

| | | | | |
|---|---|---|---|---|
| 10,070,195 | B1* | 9/2018 | Brandwine | H04N 21/4882 |
| 10,205,751 | B2* | 2/2019 | Esary | H04L 63/123 |
| 10,229,258 | B2* | 3/2019 | Kang | G06F 3/0482 |
| 10,348,783 | B2* | 7/2019 | Kowal | H04L 63/08 |
| 10,740,745 | B2* | 8/2020 | Heredia | H04L 12/2825 |
| 11,120,129 | B2* | 9/2021 | Ben David | G06F 16/148 |
| 11,263,339 | B2* | 3/2022 | Denker | H04L 63/105 |
| 11,314,486 | B2* | 4/2022 | Warstler | G06F 3/167 |
| 2005/0021983 | A1* | 1/2005 | Arnouse | G06Q 20/341 |
| | | | | 713/186 |
| 2006/0173699 | A1* | 8/2006 | Boozer | G06Q 50/184 |
| | | | | 705/310 |
| 2011/0004922 | A1* | 1/2011 | Bono | H04L 67/306 |
| | | | | 726/4 |
| 2011/0197254 | A1* | 8/2011 | Sallaka | G06F 21/6218 |
| | | | | 726/1 |
| 2012/0159296 | A1* | 6/2012 | Rebstock | G06V 30/413 |
| | | | | 715/205 |
| 2013/0191898 | A1* | 7/2013 | Kraft | G06F 21/31 |
| | | | | 726/6 |
| 2016/0328766 | A1 | 11/2016 | Krejci | |
| 2017/0199973 | A1* | 7/2017 | Walton | G16H 15/00 |
| 2018/0109570 | A1* | 4/2018 | Kowal | H04L 65/403 |
| 2018/0190050 | A1* | 7/2018 | Pinney | G06Q 10/107 |
| 2018/0197145 | A1* | 7/2018 | LaRowe | G06Q 10/105 |
| 2020/0341947 | A1* | 10/2020 | Aziz | G06F 16/1774 |
| 2022/0391521 | A1* | 12/2022 | Watry | G06F 21/31 |

* cited by examiner

FIG. 7

Was this content listing item developed under a government contract?
○ Yes
○ No

BACK　　NEXT

FIG. 8

What type of contract was it?
● SBIR
○ Other

[Contract Number]
Contract number required.

BACK　　NEXT

FIG. 9

Choose all applicable Data Rights for this listing:

UNLIMITED RIGHTS
Permitted for all uses within the government and by third parties outside the government (contractors).

LIMITED RIGHTS
Permitted for all uses within the government except it may not be used for manufacture.

RESTRICTED RIGHTS
Permitted for limited use within the government, but only on one computer at time for Computer Software.

SBIR DATA RIGHTS
The equivalent of Restricted Rights for Computer Software.

GOVERNMENT PURPOSE RIGHTS
Permitted for all uses within the government and for "Government Purposes only, with no commercial use by third parties outside the government (contractors).

SPECIFICALLY NEGOTIATED LICENSE RIGHTS
As negotiated by the parties; However must not be less than Limited or Restricted Rights.

BACK | NEXT

FIG. 10

You can make your content more accessible by modifying permissions. Select below to modify permissions and apply Creative Commons, in a whole or in part?

○ Yes, apply Creative Commons CC0 
CC0 (aka CC Zero) is a public dedication tool, which allows creator to give up their copyright and put their works into the worldwide public domain. CC0 allows reusers to distribute, remix, adapt, and build upon the material in any medium or format, with no conditions.

● No. Looks good. I'll keep SBIR Data Rights.
An opportunity for further customization will be provided later in this wizard.

|  | Public | Gov | Contractors | Others |
|---|---|---|---|---|
| Discover |  | ✓ |  |  |
| Download |  | ✓ |  |  |
| Use |  | ✓ |  |  |
| Distribute |  | ✓ |  |  |
| Modify |  | ✓ |  |  |

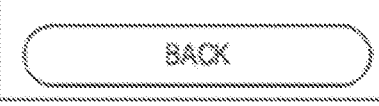 BACK     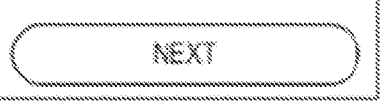 NEXT

FIG. 11

You can make your content more accessible by modifying permissions. Select below to modify permissions and apply Creative Commons, in a whole or in part?

● Yes, apply Creative Commons CC0
CC0 (aka CC Zero) is a public dedication tool, which allows creator to give up their copyright and put their works into the worldwide public domain. CC0 allows reusers to distribute, remix, adapt, and build upon the material in any medium or format, with no conditions.

Yes, apply Creative Commons CC BY-ND
This license allows reusers to copy and distribute the material in any medium or format in unadapted form only, and only so long as attribution is given to the creator. The license allows for commercial use.

No. Looks good. I'll keep SBIR Data Rights.
An opportunity for further customization will be provided later in this wizard.

|  | Public | Gov | Contractors | Others |
|---|---|---|---|---|
| Discover | ✓ | ✓ | ✓ |  |
| Discover | ✓ | ✓ | ✓ |  |
| Use | ✓ | ✓ | ✓ |  |
| Distribute | ✓ | ✓ | ✓ |  |
| Modify | ✓ | ✓ | ✓ |  |

FIG. 12

What is the Classification of this listing?

◉ Unclassified

○ Controlled Unclassified Information (CUI)
  includes legacy markings for the Official Use Only (FOUO) and Sensitive But Unclassified (SBU).

FIG. 13

Content Sharing Wizard

Limited Dissemination Control (LIMDIS)

---

Select ALL applicable Limited Dissemination Control Marking(s):
You must make at least one selection to continue.

NOT APPLICABLE
I will apply a distribution statement

NOFORN
Information may not be disseminated in any form to foreign governments, foreign nationals, foreign or international organizations, or non-US citizens.

FED ONLY
Dissemination authorized only to employees of U.S. Government executive branch departments and agencies, or armed forces personnel of the United States or Active Guard and Reserve.

FEDCON
Includes individuals or employees who enter into a contract with the U.S. to perform a specific job, supply labor and materials, or for the sale of products and services, so long dissemination is in furtherance of the contractual purpose.

NOCON
Intended for use when dissemination is not permitted to federal contractors, but permits dissemination to state, local, or tribal employees.

DL ONLY
Dissemination authorized only to those individuals, organizations, or entities including on an accompanying dissemination list.

REL to USA
Information has been predetermined by the designating agency to be releasable only to the foreign country(ies) or international organization(s) indicated, through established foreign disclosure procedures and channels.

DISPLAY ONLY
Information is authorized for disclosure to a foreign recipient, but without providing them a physical copy for retention to the foreign country(ies) or international organization(s) indicated, through established foreign disclosure procedures and channels.

DELIBERATIVE
Dissemination of information beyond the department, agency, or U.S. Government decision maker who is part of the policy deliberation can result in the loss of the privilege and is prohibited, unless the executive decision makers at the agency decide to disclose the information outside the bounds of its protection.

( BACK )  ( NEXT )

FIG. 14

Limited Dissemination Control (LIMDIS)

Provide the following details regarding the selected LIMDIS control:

Controlling Agency Name
[ Free Form ] +

Controlled by:
○ Agency XXXX
○ Agency XXXX

Your Contact Information

First Name
[ John ]

Last Name
[ Smith ]

Phone
[ 800-222-2222 ] OR

Email
[ johnsmith@gmail.com ]

Select Categories (Must select at least One)
- ∧ Critical Infrastructure
  - ☐ Ammonium Nitrate
  - ☐ Chemical-terrorism Vulnerability Information
  - ☐ Critical Energy Infrastructure Information
  - ☐ Emergency Management
  - ☐ General Critical Infrastructure Information
  - ☐ Information Systems Vulnerability Information
  - ☐ Physical Security
  - ☐ Protected Critical Infrastructure Information
  - ☐ SAFETY Act Information
  - ☐ Toxic Substances
  - ☐ Water Assessments
- ∨ Defense
  - ☐
- ∧ Export Control
  - ☐ Export Controlled
  - ☐ Export Control Research
- ∧ Financial
  - ☐ Bank Secrecy
  - ☐ Budget
  - ☐ Comptroller General
  - ☐ Consumer Complaint Information
  - ☐ Electron Funds Transfer
  - ☐ Federal Housing Finance Non-PUBLIC Information
  - ☐ Financial Securities Information ( BACK )                    ( NEXT )

FIG. 15A

Distribution Statement

Pick an applicable Distro Statement for this listing:

NOT APPLICABLE
Distribution Statements are not applicable to this content.

DISTRIBUTION STATEMENT B
Distribution authorized to U.S. Government agencies.

DISTRIBUTION STATEMENT C
Distribution authorized to U.S. Government agencies and their contractors.

DISTRIBUTION STATEMENT D
Distribution authorized to Department of Defense and U.S. DoD contractors.

DISTRIBUTION STATEMENT E
Distribution authorized to DoD Components only.

DISTRIBUTION STATEMENT F
Further dissemination only as directed.

BACK  NEXT

FIG. 15B

Pick an applicable Distro Statement for this listing:

| DISTRIBUTION STATEMENT A | DISTRIBUTION STATEMENT B |
|---|---|
| Approved for public release; distribution unlimited. | Distribution authorized to U.S. Government agencies. |

| DISTRIBUTION STATEMENT C | DISTRIBUTION STATEMENT D |
|---|---|
| Distribution authorized to U.S. Government agencies and their contractors. | Distribution authorized to Department of Defense and U.S. contractors. |

| DISTRIBUTION STATEMENT E | DISTRIBUTION STATEMENT F |
|---|---|
| Distribution authorized to Department of Defense. | Further dissemination only as directed. |

NOT APPLICABLE

Distribution Statements are not applicable to this content. Permissions will be set manually.

BACK  NEXT

FIG. 16

Content Sharing Wizard      ×

Foreign Disclosure Office (FDO)

---

What countries need access to the content?

[ Add a Country ] +

USA
○ Canada
○ Mexico ( BACK )　　　　　　　　　　( NEXT )

FIG. 17A

Distribution Statement

Thank you for running the Content Sharing Wizard.

Your permissions are set! Please certify them to submit to MOTAR. You can see them below and will be able to edit this listing further in MOTAR Studio.

|  | Public | Gov | Contractors | Others |
|---|---|---|---|---|
| Discover ○ |  | ✓ |  |  |
| Download ○ |  | ✓ |  |  |
| Use ○ |  | ✓ |  |  |
| Distribute ○ |  | ✓ |  |  |
| Modify ○ |  | ✓ |  |  |

Permissions: <Data Right> + Customization (if they make a change)
Distribution Statement B
Classification: CUI//REL TO USA, CAN, MEX
Controlled By: Office of XXX
CUI Category: Toxic Substances, Budget
Releasability: USA, Canada, Mexico
POC: John Smith, johnsmith@us.af.mil Upload License
Please upload any documents that shows proof of permissions to any of you selected permissions. Accepted file formats include .pdf, .jpg, .png

Upload FDO Approval
Please upload any FDO documents include .pdf, .jpg, .png

☐ I certify that the information above is correct and ready to share.

|  | Public | Gov | Contractors | Others |
|---|---|---|---|---|
| Discover | ⊕ | ✓ | ⊕ | ⊕ |
| Download | ⊕ | ✓ | ⊕ | ⊕ |
| Use | ⊕ | ✓ | ⊕ | ⊕ |
| Distribute | ⊕ | ✓ | ⊕ | ⊕ |
| Modify | ⊕ | ⊕ | ⊕ | ⊕ |

Contract Number 123456
Data Rights Restricted Rights
Classification: Unclassified
Releasability: USA
License:

⊚ Completed by @vendortest

Upload Supported Documents

Please upload any documents that shows proof of permissions to any of you selected permissions. Accepted file formats include .pdf, .jpg, .png.

UPLOAD DOCUMENTS

☑ I certify that the information above is correct and ready to share.

BACK  RESTART                                              NEXT

PERMISSIONS WIZARD FOR IMMERSIVE CONTENT SHARING ECONOMY HUB

This application claims priority to U.S. Provisional Patent Application No. 63/196,638, filed on Jun. 3, 2021, which is incorporated by reference herein in its entirety.

FIELD

This invention relates generally to the field of data and asset permissions, and more particularly embodiments of the invention relate to a permissions wizard for efficiently assigning permissions to immersive content available for consumption in a sharing economy hub.

BACKGROUND

The Department of Defense and other government agencies recognize the value of immersive technologies (e.g. virtual, augmented, and mixed reality) and other emerging enabling technologies (e.g. artificial intelligence, lidar scanning, and photogrammetry) for use in training and operations. However, due to the siloed and bureaucratic nature of government acquisitions and program management, the development of the same or very similar applications and assets (e.g. 3D models) is often paid for multiple times. Training, simulation, and operational content developed and deployed for the government should operate with a modular open systems approach and target a common operating environment that expects compatibility, interactivity and security. However, training content developers do not create standardized or interoperable software environments. New models of continuous integration/continuous deployment environments, such as the USAF Platform One, seek to establish such spaces for software development, but do not yet support a unified training system for specialized content development.

In view of the art, there exists a need for effective processes, programmatic, and contractual solutions to identify and efficiently assign permissions based on who can access, download, share, re-use, and modify, re-mix, and re-list content, and how a contributor or author credit designation and/or license fees might be handled. Further, how does a central hub respect data rights, incentivize contributors and fuel a collaborative ecosystem.

Building virtual, augmented, and mixed reality (extended reality, or XR, collectively) content using modular open systems approach architecture, provides the opportunity for a central hub which allows discovery and distribution of different types of digital assets (e.g. XR applications, XR lessons, 3D models, AI/ML models, assessment tools, visualization tools). Enabling the hub to support a sharing economy that features the authors of the digital assets demonstrates the conceptual advantages of open-systems development to the training systems content marketplace.

The main difference between a hub and a federated network is that in a federated network, each vendor or entity is responsible for its connections to other vendors and entities, whereas in a hub all vendors and entities connect to the hub and the hub manages connections between them within its boundary. The main advantage of a hub is the economy achieved for vendors and entities needing only to manage connections to the hub, compared to every other vendor or entity they may interact with, as in a federation. Additionally, with all of the connections aggregated through a hub, user and permission management is centralized and analytic data is easily captured, made accessible and distributable through the hub.

BRIEF SUMMARY

Embodiments of the present invention address the above needs and/or achieve other advantages by providing apparatuses and methods that provide a permissions wizard module for an immersive training sharing economy hub.

In one aspect, the present invention provides a hub system for use in a sharing economy. The hub system includes a memory device, for storing a permissions wizard module, and a processing device. The processing device is configured to receive a request to set permissions for a listing in the sharing economy from a contributing user. The listing comprises content, or a link to content. The processing device is further configured to execute the permissions wizard module for the listing. Executing the permissions wizard module comprises the steps of: accessing a predetermined permissions map, determining the contributing user's user type, identifying a workflow to implement, implementing the identified workflow, assigning data security level (if required), applying the predetermined permissions map to generate a permissions recommendation, displaying the permissions recommendation, and requesting confirmation to proceed with the permissions recommendation. In some embodiments, the system allows the contributing user to modify listing permissions to expand permissions from time to time. In some embodiments, the contributing user is the creator of the content. Additionally, or alternatively, the contributing user is the up-loader of the content. In other embodiments, the contributing user is neither the creator nor the uploader of the content. In some embodiments the contributing user may be a group of users who can create or modify a content listing.

In some embodiments, executing the permissions wizard module further includes receiving confirmation to proceed with the permissions recommendation, assign permissions associated with the permissions recommendation to the listing, and publishing the listing to the sharing economy. In some embodiments, the permissions wizard module may request the data security level of the content and assign the data security level to the listing. In some embodiments, the listing comprises content. In some embodiments, the new listing comprises a link to access the content. Additionally, or alternatively, the processing device is further configured to receive input indicating that an identified Creative Commons license should be applied to the new listing, assign permissions associated with the identified Creative Commons license to the new listing, and publish the new listing to the sharing economy.

In some embodiments, the permissions wizard module further comprises determining that the contributing user is a non-government type user and requesting, from the contributing user, whether the content was developed under a government contract. In some embodiments, the permissions wizard module further comprises receiving input from the contributing user that the content was developed under a government contract and requesting the type of government contract.

In some embodiments, the permissions wizard module further comprises determining that the contributing user is a government type; and requesting, from the contributing user: a data security level of the content, applicable LIMDIS control markings, and details regarding LIMDIS control.

In some embodiments, the permissions wizard module further comprises determining that the contributing user is a government type user, requesting the security level of the content, and requesting an applicable distribution statement. In some embodiments, the permissions wizard module further comprises requesting applicable LIMDIS control markings, and other details regarding LIMDIS control.

In some embodiments, the processing device is further configured to identify an accessing user's user type, determine the accessing user's permissions for a listing, and display to the accessing user the listing according to their permissions. In some embodiments, the processing device may provide the accessing user an opportunity to request further access to the listing, and upon receiving the request, enable the contributing user to modify the permissions for the listing.

In another aspect, the present invention provides a method for assigning permissions to a listing within a sharing economy. The method comprises: receiving a request to create a listing from a contributing user, where the listing comprises new content, and executing a permissions wizard module. Executing the permissions wizard module comprises the steps of: determining the contributing user's user type, identifying a workflow to implement, implementing the identified workflow, applying the predetermined permissions map to generate a permissions recommendation, presenting the permissions recommendation, and requesting confirmation to proceed with the permissions recommendation.

In some embodiments, executing the permissions wizard module further includes receiving user confirmation of the permissions recommendation, assigning permissions associated with the permissions recommendation, and publishing the new listing based on the assigned permissions. In some embodiments, the method further comprises assigning a data security level to the listing. In some embodiments, the permissions wizard module may request the data security level of the content and assign the data security level to the listing.

Additionally, or alternatively, the method further comprises receiving input indicating that an identified Creative Commons license should be applied to the new listing, assigning permissions associated with the identified Creative Commons license to the new listing, and publishing the new listing to the sharing economy.

In some embodiments, the method further comprises: determining an accessing user's permissions for a listing, and displaying to the accessing user the listing according to the accessing user's permissions for the listing. Additionally, or alternatively, the method further comprises providing to the accessing user an opportunity to request further access to the listing, and upon receiving said request, enabling the contributing user to alter the accessing user's permissions for the listing.

In another aspect, the present invention provides a hub system for use in a sharing economy. The hub system comprising a memory device, and a processing device. The memory device stores a permission wizard module. The processing device is configured to: receive a request from an accessing user to access a listing, determine the accessing user's user type, retrieve stored permissions for the listing, determine what permissions the accessing user has for the listing, and display to the accessing user, the permissions the accessing user has for the listing. In some embodiments, the processing device is further configured to display the listing the user. In some embodiments, the processing device is configured to allow the accessing user to download the content of the listing. In some embodiments, the processing device is configured to allow the accessing user to use (e.g. login to app or use a 3D model) the content of the listing. Additionally, or alternatively, the processing device is further configured to allow the accessing user to make changes, or modify, to the content of the listing. In some embodiments, the processing device is further configured to allow the accessing user to share the content of the listing with another user.

In some embodiments, the plurality of user types comprises a non-government (or contractor) type and a government type. In other embodiments, non-government includes Public or others groups of users. Additionally, or alternatively, determining a user type comprises authenticating the user.

The features, functions, and advantages that have been discussed may be achieved independently in various embodiments of the present invention or may be combined with yet other embodiments, further details of which can be seen with reference to the following descriptions and drawings.

BRIEF DESCRIPTION OF THE DRAWINGS

Figure 1:
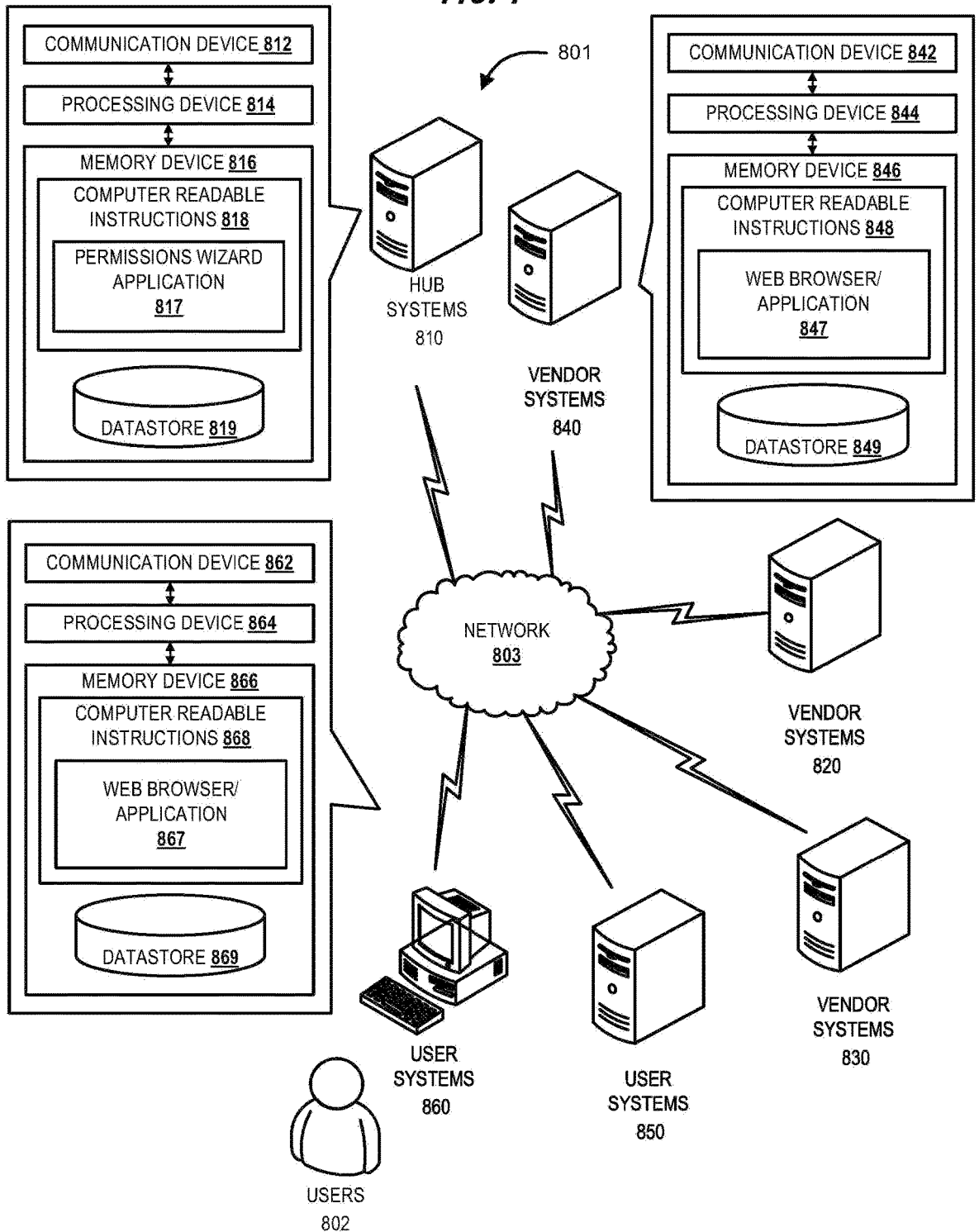
Figure 2:
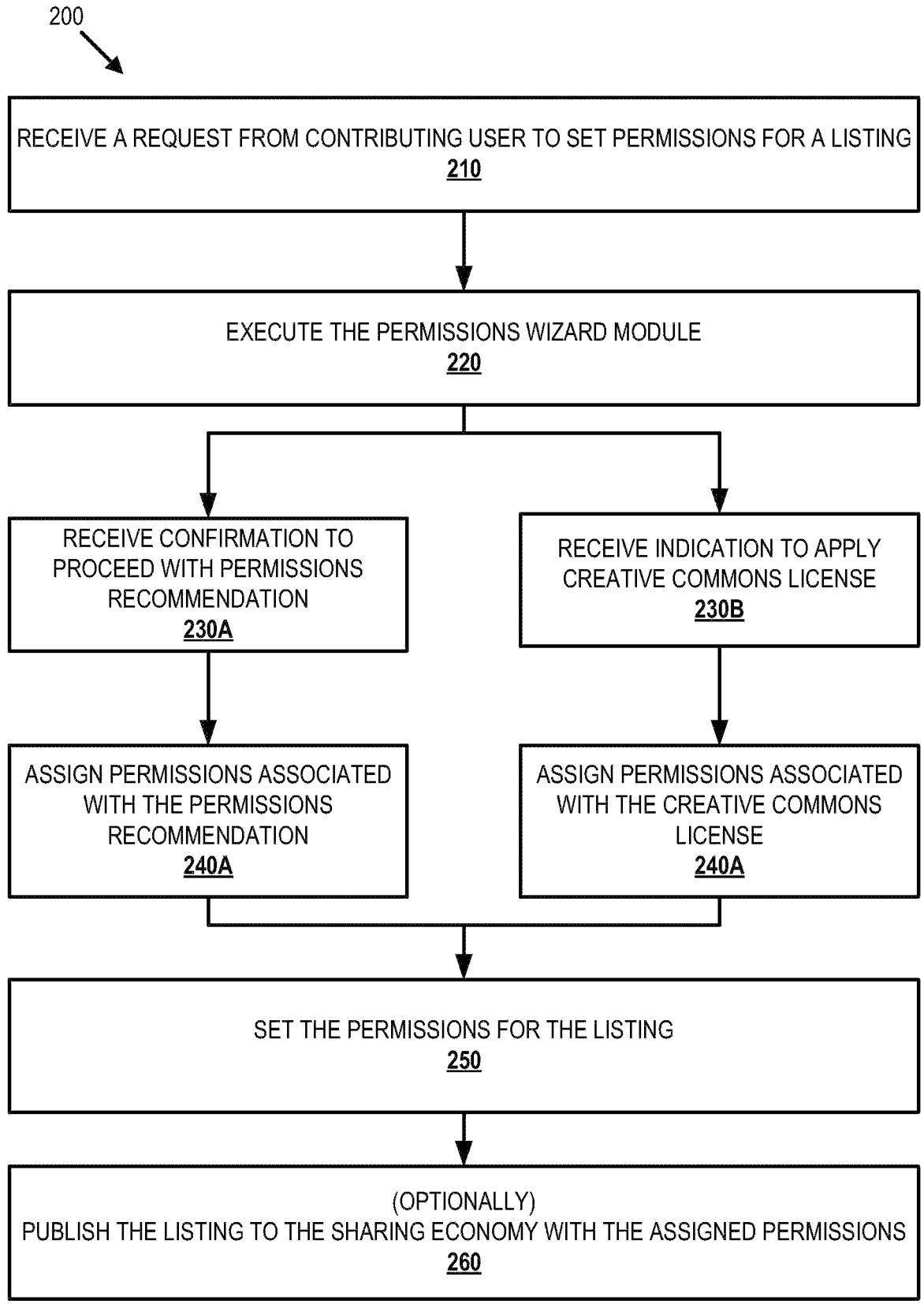
Figure 3:
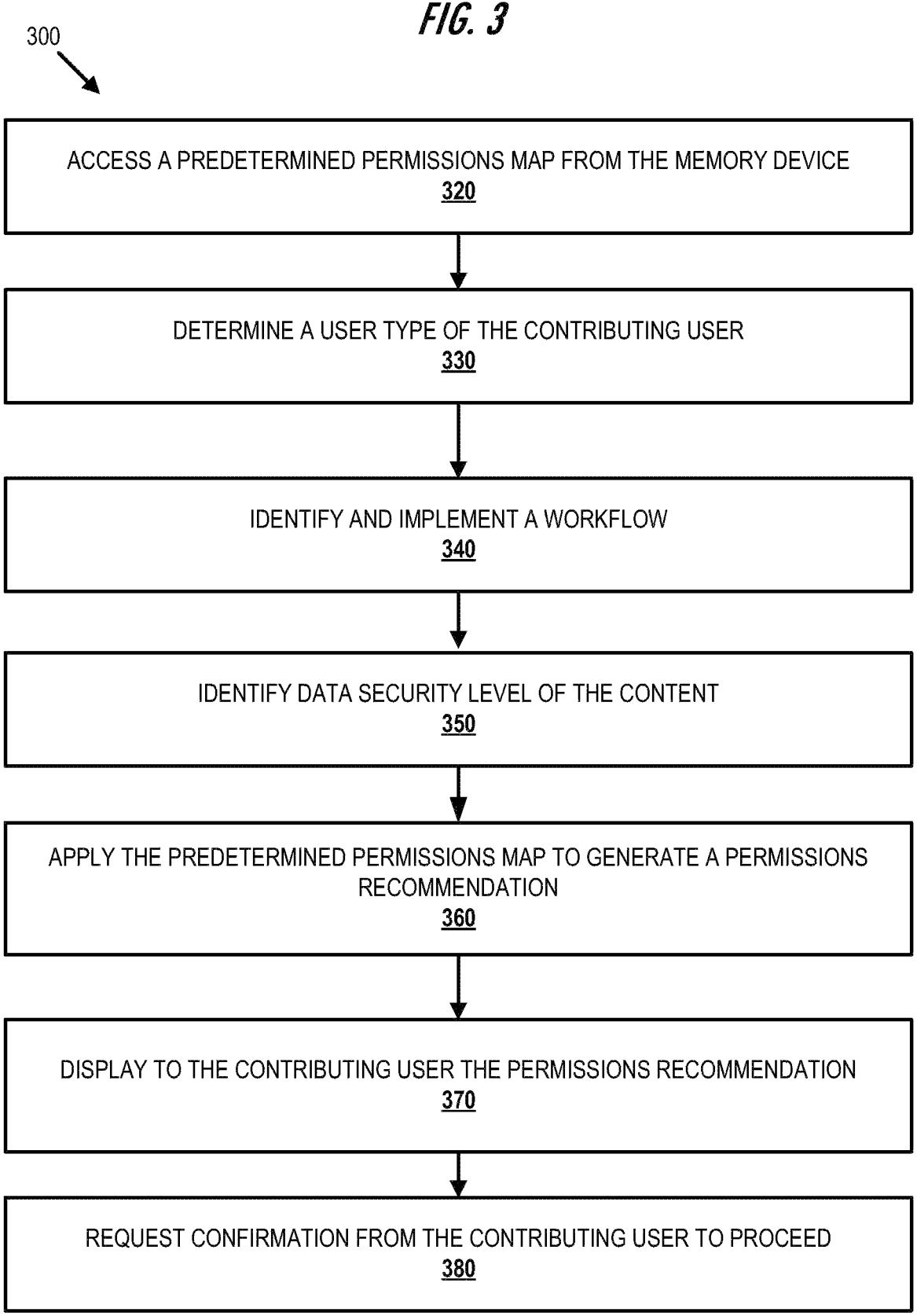
Figure 4:
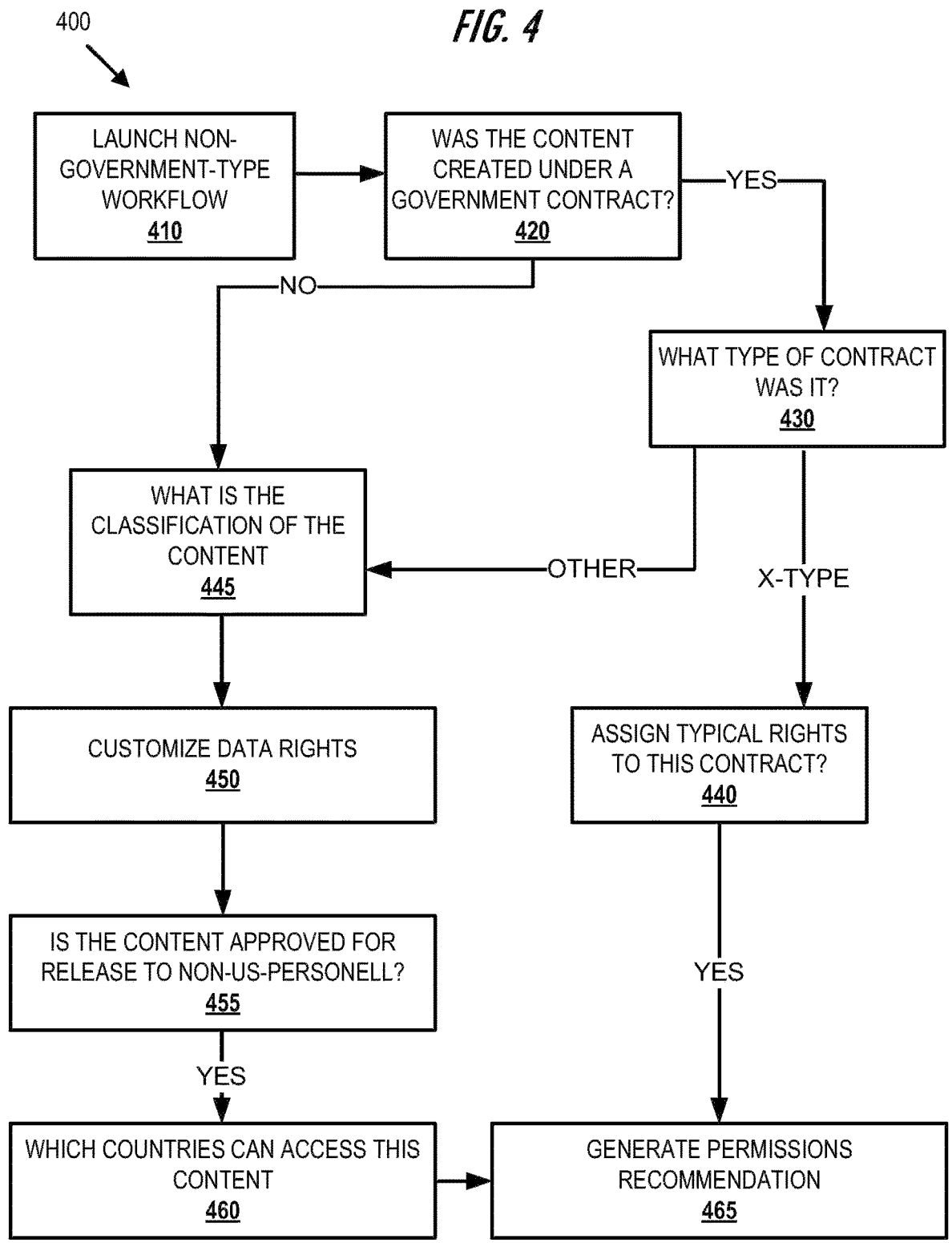
Figure 5:
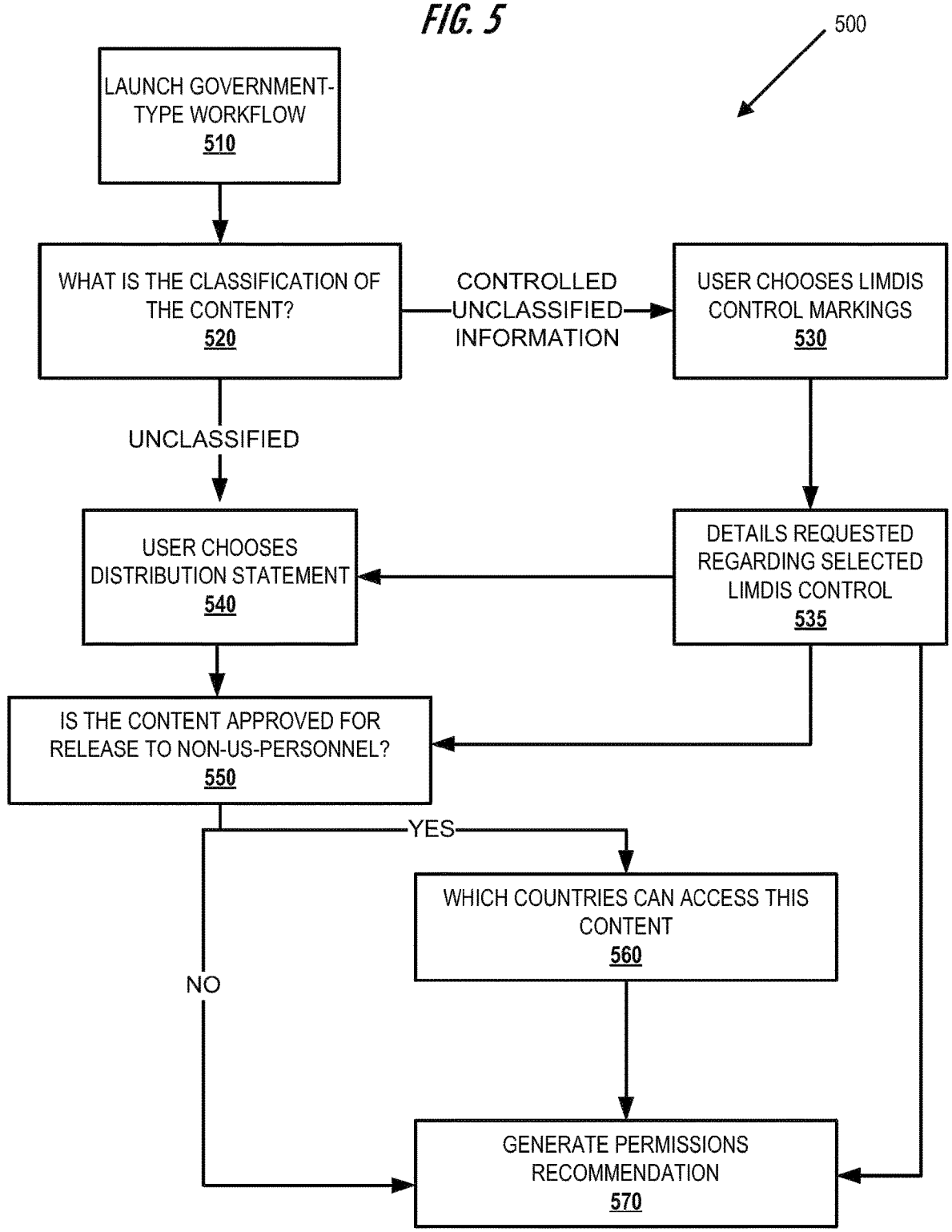
Figure 6:
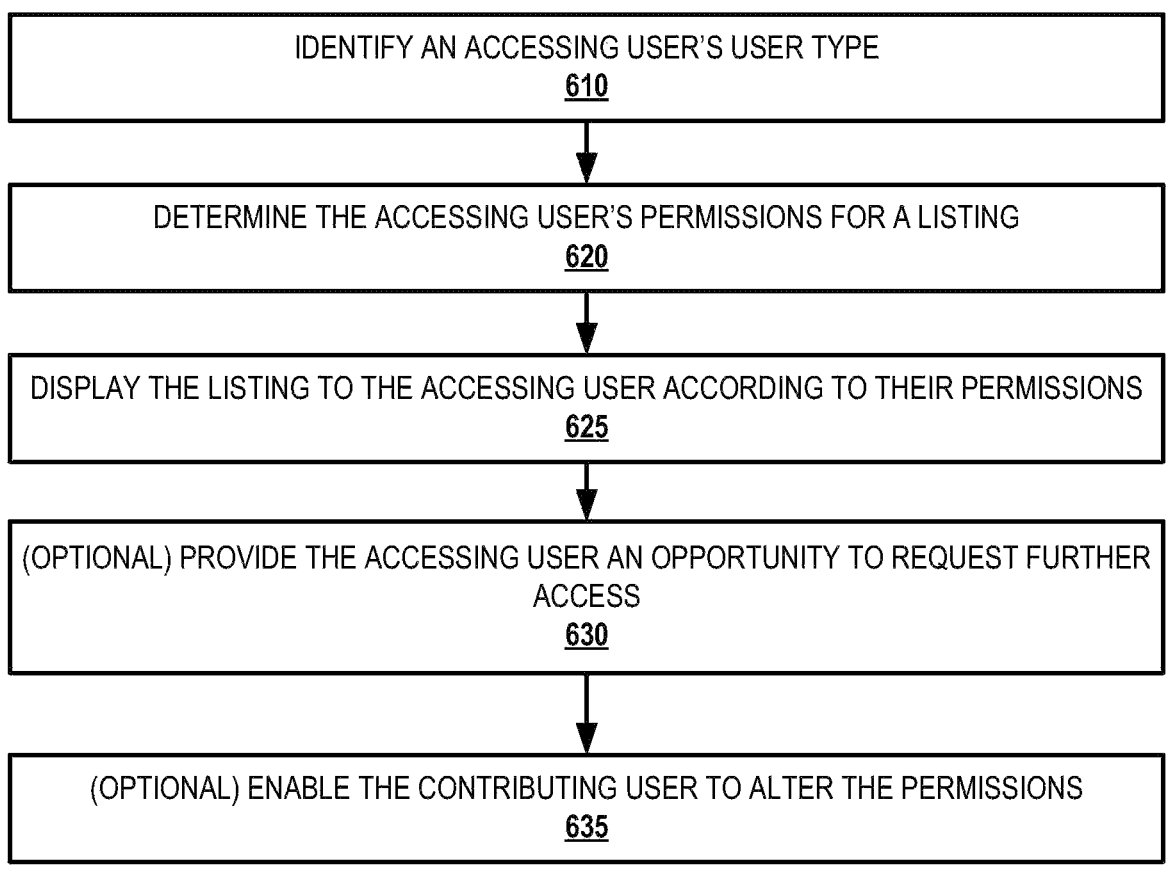
Figure 17B:
Figure 18B:
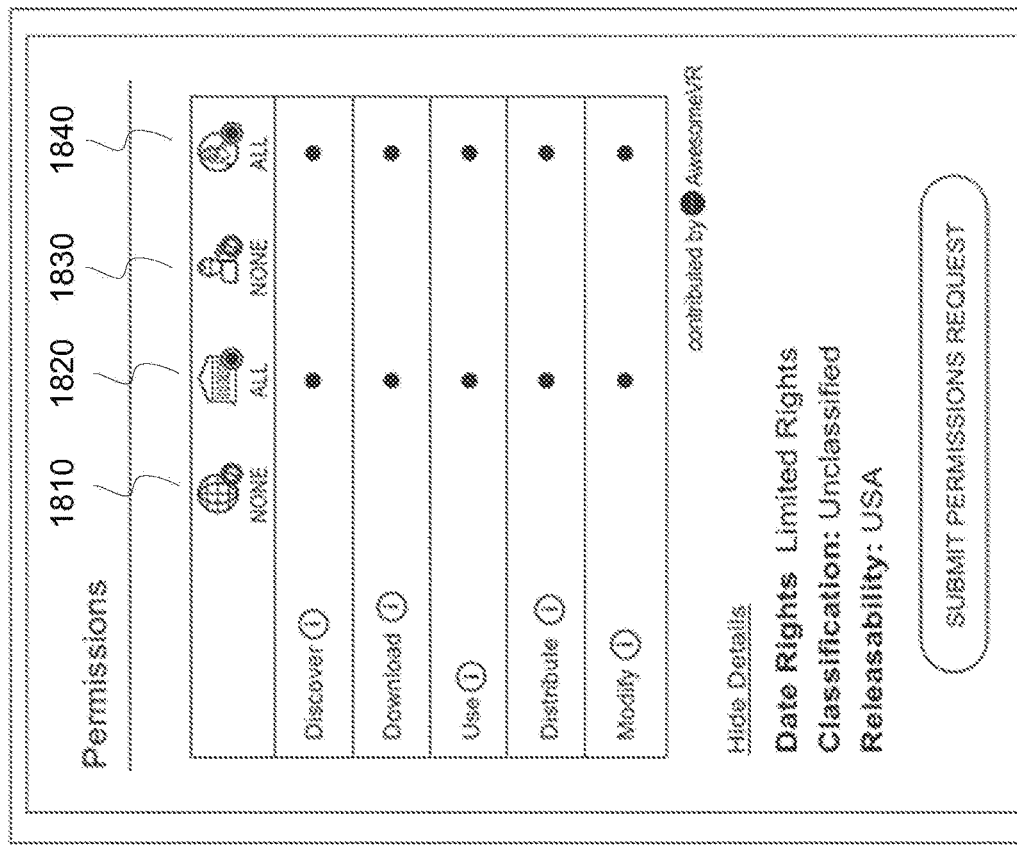
Figure 18A:
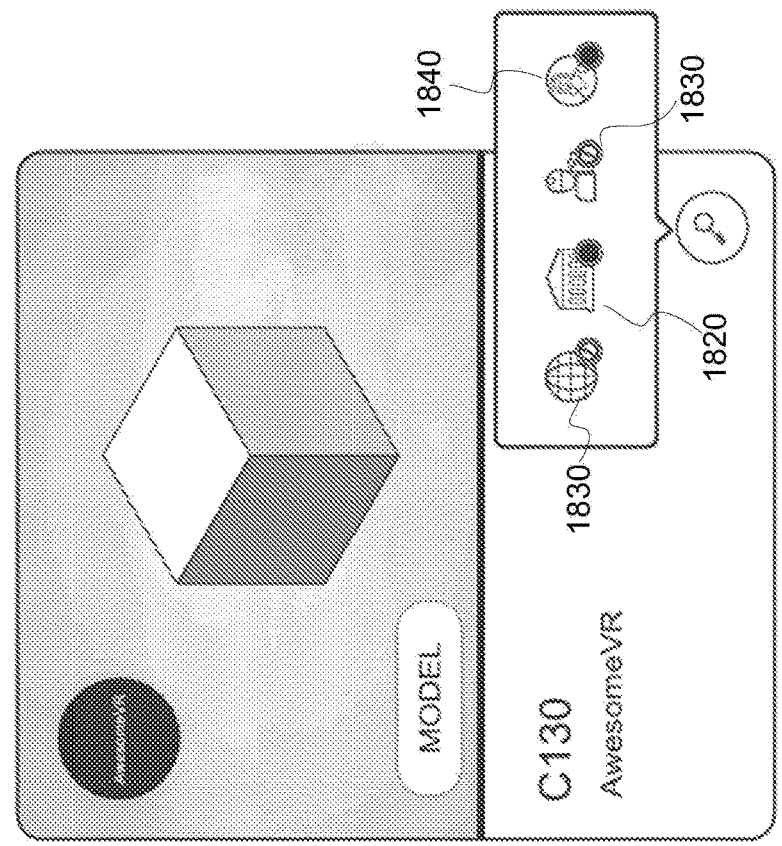
Figure 19:

Having thus described the embodiments of the present invention in general terms, reference will now be made to the accompanying drawings, wherein:

FIG. 1 is a diagram representing the system environment in which the sharing economy operates;

FIG. 2 is a process flow for the utilization of a permissions wizard module in a sharing economy hub, in accordance with an embodiment of this invention;

FIG. 3 is a process flow for the execution of a permissions wizard in a sharing economy hub in accordance with an embodiment of this invention;

FIG. 4 is an illustration of a workflow within a permissions wizard in a sharing economy hub in accordance with an embodiment of this invention;

FIG. 5 is an illustration of a workflow within a permissions wizard in a sharing economy hub in accordance with an embodiment of this invention;

FIG. 6 is a process flow for accessing a new listing within a sharing economy hub in accordance with an embodiment of this invention;

FIG. 7 is an exemplary screenshot illustrating a request from within a permissions wizard module in accordance with an embodiment of this invention;

FIG. 8 is an exemplary screenshot illustrating a request from within a permissions wizard module in accordance with an embodiment of this invention;

FIG. 9 is an exemplary screenshot illustrating a request from within a permissions wizard module in accordance with an embodiment of this invention;

FIG. 10 is an exemplary screenshot illustrating a request from within a permissions wizard module in accordance with an embodiment of this invention;

FIG. 11 is an exemplary screenshot illustrating a request from within a permissions wizard module in accordance with an embodiment of this invention;

FIG. 12 is an exemplary screenshot illustrating a request from within a permissions wizard module in accordance with an embodiment of this invention;

FIG. 13 is an exemplary screenshot illustrating a request from within a permissions wizard module in accordance with an embodiment of this invention;

FIG. 14 is an exemplary screenshot illustrating a request from within a permissions wizard module in accordance with an embodiment of this invention;

FIG. 15A is an exemplary screenshot illustrating a request from within a permissions wizard module in accordance with an embodiment of this invention;

FIG. 15B is an exemplary screenshot illustrating a request from within a permissions wizard module in accordance with an embodiment of this invention;

FIG. 16 is an exemplary screenshot illustrating a request from within a permissions wizard module in accordance with an embodiment of this invention;

FIG. 17A is an exemplary screenshot illustrating a permissions recommendation from within a permissions wizard module in accordance with an embodiment of this invention;

FIG. 17B is an exemplary screenshot illustrating a permissions recommendation from within a permissions wizard module in accordance with an embodiment of this invention;

FIG. 18A is an exemplary screenshot illustrating a listing from within a permissions wizard module in accordance with an embodiment of this invention;

FIG. 18B is an exemplary screenshot illustrating a listings permissions from within a permissions wizard module in accordance with an embodiment of this invention;

FIG. 19 is an exemplary screenshot illustrating a listing's permissions from within a permissions wizard module in accordance with an embodiment of this invention;

Figures 20, 21:
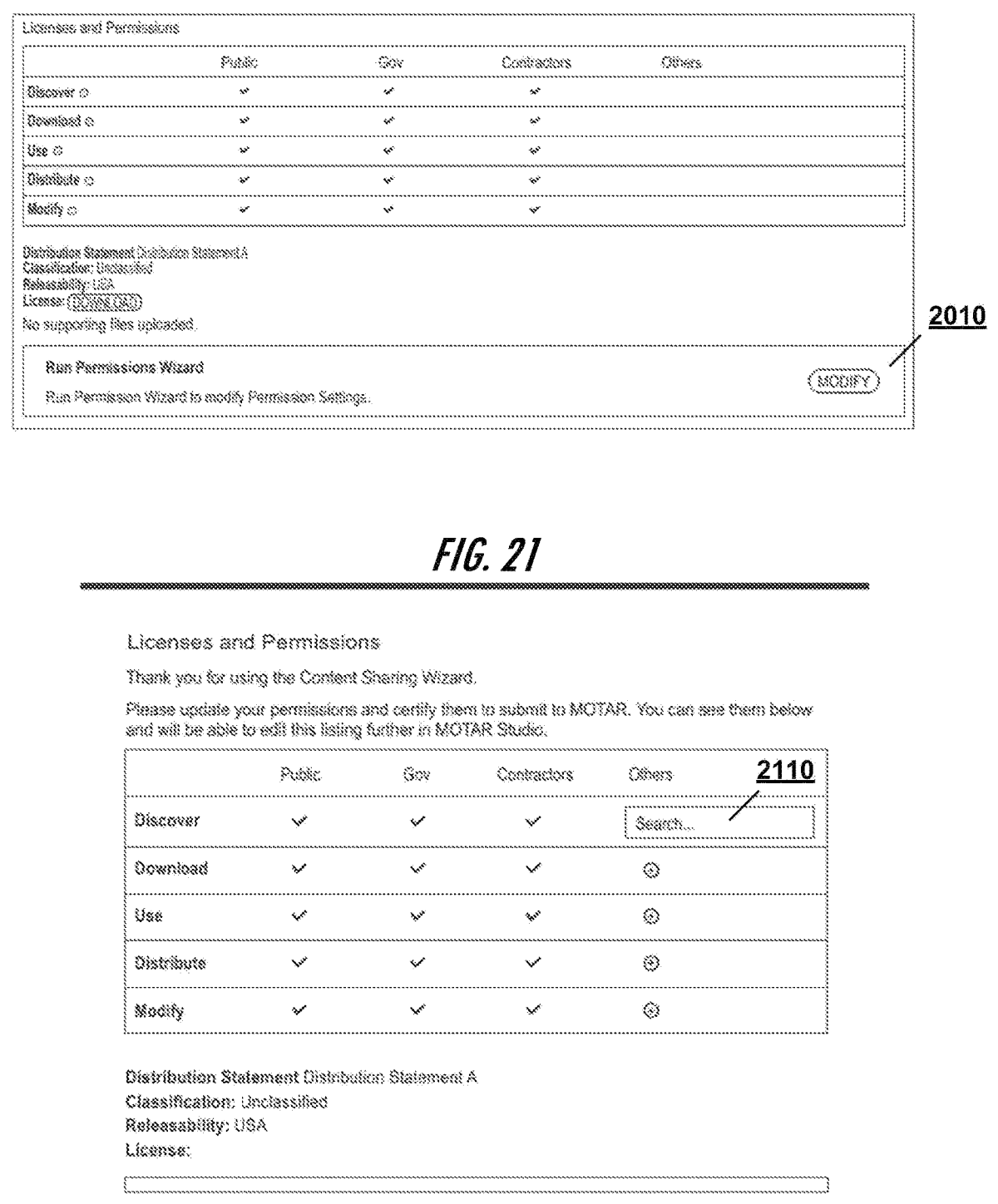

FIG. 20 is an exemplary screenshot illustrating a listing from within a permissions wizard module in accordance with an embodiment of this invention;

FIG. 21 is an exemplary screenshot illustrating a listing's permissions from within a permissions wizard module in accordance with an embodiment of this invention; and FIG. 22 is an exemplary screenshot illustrating a permission recommendation from within a permissions wizard module in accordance with an embodiment of this invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

High fidelity training has always been critical to ensuring the readiness of U.S. Warfighters, particularly to supplement training for those positions in which live training is high-risk and requires expensive resources to conduct (e.g. pilot training). However, high fidelity training simulators have traditionally been developed as closed systems, making them generally difficult to make updates or changes to. Therefore, the U.S. Government is interested in building the training systems of the future with a Modular Open Systems Approach (MOSA), with integrated training technologies that are easily accessed, updated, and shared. XR technologies are generally being developed on a handful of gaming engines, which lends itself to finding efficiencies in reusing different levels of objects across training—from 3D models, environments, and other assets, to full lessons and experiences. Further, agnostic training tools such as AI models, virtual instructors, and evaluation tools, can be applied across different training scenarios and systems. However, this requires a sharing economy across vendors in the training ecosystem.

Some prominent examples of sharing economies include Amazon, Shopify, YouTube, Roblox, GitHub, and Thingiverse. Each of these sharing economies face their own specific challenges to development and facilitation. In the present invention, various technical challenges exist to get all the disparate software, hardware, AI, sensors, etc. to be willing and able to communicate with each other. It is important for the ecosystem to remain as hardware and software agnostic as possible. While there are multiple standards that help guide technical solutions, forward leaning efforts, such as those currently being undertaken by Open Standards, and the Institute of Electrical and Electronic Engineers (IEEE) Learning Technology Standards Committee (LTSC) may help inform the efforts to overcome this challenge. There are also process challenges such as determining how permissions are implemented across the ecosystem. To facilitate a sharing economy, the platform must define variations of access and usability, respect Intellectual Property, Data Rights and Distribution Statements, account for classification, correlate those considerations to assigned permissions, and support "orphaned" technologies.

The present invention provides a system for the development of permissions across the ecosystem utilizing three integral components: (1) determining how permissions could and should impact the discoverability and access of content within the ecosystem; (2) identifying the different types or levels of allowable content interaction; and (3) determining a user's ability to access (download or login to), share, re-use (distribute), and modify content based on content's attributes and user access permissions (data rights or Creative Commons, distribution or "distro" statements, classification, and releasability).

In some embodiments, the permissions that an accessing user may have are: "Discover," "Download," "Use," "Distribute," and "Modify." Discover permissions allow a user to view the listing details page. Download permissions allow a user to download the listing. Use permission give the user the rights to use, display, and include the listing in their applications or in the case of an application, allow a user to login to the application. Distribute permissions allow the user to use, display, and include the listing in other published listings or in the case of an application, to be able to share that application. Modify permissions give the user the right to make derivatives, modifications, and alterations to the listing as well as use, display, and include the modified, or remixed, version in other published listings. In some embodiments, where the Discover permission is restricted (not allowed or enabled) for a user, the user will see that the listing exists, however they cannot see any details of the listing. Additionally, or alternatively, a user may see that a listing appears for the user, so that the user knows of its existence, thus indicating the user has Discover permissions for that listing. The user may then request permissions to view additional information about the listing and if approved a discover permission is added for that user. In some embodiments, an administrator or user with certain permissions may elect to hide certain listing(s) from users with lesser permissions. In other words, a user may not have Discover permissions for a particular listing, and such user will not see that listing on the dashboard. The user can request permissions to discover, access, share, and/or modify, content. Once a user requests additional permissions, the system will send the request to the contributor or another user from the contributing organization who can then approve expanded permissions from the original permissions through the hub dashboard.

The first integral component, determining how permissions could and should impact the discoverability and access of content within the ecosystem, presented a complex puzzle. The numerous factors that must be accounted for add to the complexity. Given that content created by vendors (contractors) may have associated Data Rights, as defined by their contractual agreement(s) with the government, and that some content could have Distribution Statements assigned by the designated government authority, and that vendors may provide content through their own initiative, in which case Creative Commons standards may apply, there are many variables that can impact the permissions assigned to content. Add in the security designations, either Unclassified or Controlled Unclassified Information (CUI), government Public Affairs approval for public release, and potential accessibility by foreign personnel, and the complexity continues to grow. Permissions may be set by permission breakdown (e.g. Discover, Download, Use, Distribute, and Modify), user type (e.g. government user, DoD user, organization user, contractor, public user, etc), distribution statements (e.g. Distro A, Distro B, etc), data rights (e.g. SBIR data rights, Creative Commons, etc), and classification of the listing (e.g. unclassified, CUI, and classified).

An integral step is defining factors that influence permissions. Data rights can be defined based on different criteria for different implementations of the invention. In one embodiment, the factors defining permissions are based on the Data Rights for the Department of Defense (DOD) Acquisitions.

In some embodiments, distribution statements (or distro statements) may be defined in accord with the Department of Defense (DOD) Technical Information Center. DOD Distributions Statements include: Distribution Statement A: the content is approved for public release, distribution is unlimited; Distribution Statement B: distribution is authorized to US Government agencies and other requests will be referred to DOD; Distribution Statement C: distribution is authorized to U.S. government agencies and their contractors, and other requests will be referred to DOD; Distribution Statement D: distribution is authorized to DOD and DOD contractors only, and other requests will be referred to DOD; Distribution Statement E: Distribution is authorized to DOD components only, and other requests will be referred to DOD; and Distribution Statement F: further dissemination only as directed by DOD authority. It should be understood that other distribution statements may be utilized depending on the content and particular permissions granted to that content. In some embodiments, distribution statements from other federal government agencies may be used. In other embodiments broad federal government distribution statement or specific federal agencies distribution statements may apply.

In some embodiments, permissions associated with Creative Commons Licenses will be assigned to a particular listing. Creative Commons give everyone from individual creators to large institutions a standardized way to grant the public permission to use their creative work under copyright law. The Creative Commons licenses were defined based on an accepted standard. From the user's perspective, the presence of a Creative Commons license on a copyrighted work answers the question, "What can I do with this work?" There are six different license types defined by Creative Commons, with varying degrees of permissiveness utilized in embodiments of the invention. The CC BY license allows users to distribute, remix, adapt, and build upon the material in any medium or format, as long as credit is given to the creator. The CC BY-SA license allows users to distributed, remix, adapt, and build upon the material in any medium or format, as long as credit is given to the creator and the user must license the modified material under identical terms. The CC BY-NC license allows users to distribute, remix, adapt, and build upon the material in any medium or formation for noncommercial purposes only and as long as credit is given to the creator. The CC BY-NC-SA license allows users to distribute, remix, adapt, and build upon the material in any medium or formation for noncommercial purposes only and as long as credit is given to the creator and the user must license the modified material under identical terms. The CC BY-ND license allows user to copy and distribute the material in any medium or format in an un-adapted form only, as long as credit is given to the creator. The CC BY-NC-ND license allows users to copy and distribute the material in any medium or format in un-adapted form only, for noncommercial purposes and as long as credit is given to the creator. The CC0 (CC Zero) allows creators to give up their copyright and allows for users to distribute, remix, adapt, and build upon the material in any medium or format with no conditions. The creative commons license uses the terms: distribute, remix, adapt, and build upon. The terms remix, adapt, and build upon correlate to the "modify" term within the sharing economy hub. Other applicable data rights include: Unlimited Rights, permitted for all users within the government and by third parties outside the government such as contractors; Limited Rights, permitted for all users within the government, except it may not be used for manufacture; Restricted Rights, permitted for limited use within the government but only on one computer at a time in the case of computer software; SBIR Data Rights provide government rights for twenty years during which the data cannot be released to any contractors; Government Purpose Rights, permitted for all uses within the government and for government purposes only, with no commercial use by third parties outside the government; and Specifically Negotiated License Rights, rights specifically negotiated by third parties that may not be less than Limited Rights or Restricted Rights.

In some embodiments, permissions associated with Controlled Unclassified Information (CUI) are applied. These permissions may include Limited Dissemination Control Markings including: NOFORN, DL Only, FED Only, REL to USA, FEDCON, Display Only, NOCON, and Deliberative. When a listing has NOFORN control markings, the listing may not be disseminated in any form to foreign governments, foreign nationals, foreign or international organizations, or non-US citizens. When a listing has DL Only control markings, the listing is authorized to be disseminated only to individuals, organizations, or entities included on an accompanying dissemination list. When a listing has FED Only control markings, the listing may be disseminated only to employees of the U.S. government executive branch departments and agencies, or armed forces personnel of the United States, or Active Guard and Reserve. When a listing has REL to USA content markings, the listing may be disseminated to foreign countries or international organizations indicated through established foreign disclosure procedures and channels. When a listing has FEDCON content markings, the listing may be disseminated to individuals and employees who enter into a contract with the U.S. to perform a specific duty. When a listing has Display Only content markings, the information may be disclosed to a foreign recipient but without providing a copy for retention. When a listing has NOCON content markings, the listing may be disseminated to state, local, or tribal employees but not to federal contractors. When a listing has Deliberative content markings, the listing may not be disseminated beyond the department, agency, or U.S. government decision maker who is part of the policy deliberation can result in the loss of the privilege and is prohibited unless the executive decision makers at the agency decide to disclose the listing outside the bounds of its protection. In some embodiments, when none of the Limited Dissemination Control Markings apply to a listing, the user may be required to select an applicable distribution statement at another step in the workflow.

Once the variables were defined, the second step was to correlate and map permissions and user abilities. The process to identify the different types or levels of allowable content interaction started with those identified by Creative Commons. Creative Commons categorizes different types as the user's ability to distribute, remix, adapt, and build upon content in the ecosystem. At several iterations and taking into recount the various origins of the permissions, users' ability to access, download, share, re-use, and modify content set the foundation for content interaction.

The process to determine a user's ability to access (or download), share, re-use (or distribute), and modify content based on content's attributes (determined by data rights or Creative Commons, Distribution statements, and classification) is dependent on the user's attributes and role. However, the content's attributes are the key to the process. Systematically defined, the process to determine user's ability to access, share, re-use, and modify content is based on the content's permissions attributes assigned through a permissions wizard by the content contributor and the accessing user's account attributes and roles.

Embodiments of the present invention discloses a permissions wizard for an immersive training sharing economy hub. The Vendor or User System calls a URL that triggers a hub system to execute the permissions wizard module and causes a processing device to receive a request from a user to update an unpublished pending listing or create a new listing comprising new content in the sharing economy and run the permissions wizard module for the listing; access from the memory device a predetermined permissions map; determine which of a predetermined plurality of user types submitted the request; identify, based on the determined user type, which of a plurality of flows to implement; request and receive user input whether the new listing was developed under a government contract and the type of government contract—for example an SBIR contract; based on the received user responses (user being the content "contributor"), apply the predetermined permissions map to generate a permissions recommendation; receive data security level, and display the permissions recommendation to the user and request confirmation for proceeding with the permission recommendations. In some embodiments, the permissions wizard module causes the processing device to receive user confirmation to proceed with the permission recommendation; assign permissions associated with the permission recommendation to the listing; and in response to assigning the permissions, allow for publishing the new listing to the sharing economy, thereby enabling access to the new listing only to those users possessing corresponding assigned permissions. In other embodiments, the permissions wizard module causes the processing device to receive user input that an identified Creative Commons license should be applied to the new listing than the permissions recommendation; assign permissions associated with the user identified Creative Commons license to the new listing; and in response to assigning the permissions, allow for publishing the new listing to the sharing economy, thereby enabling access to the new listing only to those users possessing assigned corresponding permissions.

Referring now to FIG. 1, a network diagram illustrating an environment in which an embodiment of the sharing economy 801 discussed herein operates. The environment 801 may include a hub system 810, a plurality of vendor systems 820, 830, and 840 and a plurality of user systems 850, 860 operated by users 802. The hub system 810 generally comprises a communication device 812, a processing device 814, and a memory device 816. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device. In some embodiments, the vendor system and the user system are the same system, if the vendor is the user.

The vendor system 840 and/or the user system 860 may be or include a mobile device such as a tablet computer, a smartphone, a laptop computer, a desktop computer, or the like. The hub is an interactive environment that may be stored and/or run on cloud computing systems and/or on local system servers and/or virtual computing resources. For simplicity purposes, the collection of localized server(s) and/or cloud computing systems is depicted in FIG. 8 as the hub systems 810. Likewise, the vendor systems 840 and/or the user systems 860 may be or include cloud computing resources and/or virtual computing resources. In various embodiments of the hub, vendors and/or users may access the hub through a dedicated application (app) or a portal which may be accessed through a browser application.

In various embodiments, the hub listings may be, or include a link to content. In some cases, the content may require a specific application (app) for running the content. Accordingly, the vendor page or app may provide both content and content-running application and/or links to such items. The permissions wizard module may be accessed and run either through the hub portal directly or through the vendor portal or app in some cases.

The processing device 814 is operatively coupled to the communication device 812 and the memory device 816. The processing device 814 uses the communication device 812 to communicate with the network 803 and other devices on the network 803, such as, but not limited to the user systems 860 and the vendor systems 840. As such, the communication device 812 generally comprises a modem, server, or other device for communicating with other devices on the network 803.

In some embodiments, vendors have an application ("app") or portal that enables its authorized agents and/or users of the hub to create or modify listings for the hub. In some cases, these agents or users may run the permissions wizard module through the vendor app or portal.

As further illustrated, the hub system 810 comprises computer-readable instructions 818 stored in the memory device 816, which in one embodiment includes the computer-readable instructions 818 of a permissions wizard application or module 817. In some embodiments, the memory device 816 includes data storage 819 for storing data related to the permissions, vendors, users, listings, apps, the predetermined permissions map, and data created and/or used by the permissions wizard module 817 or the user 802. The data storage 819 may also store real-time update information for listings, permissions, vendors, users and the like.

The user system 860 generally comprises a communication device 862, a processing device 864, and a memory device 866. The processing device 864 is operatively coupled to the communication device 862 and the memory device 866. The processing device 864 uses the communication device 862 to communicate with the network 803 and other devices on the network 803, such as, but not limited to the hub system 810, and in some configurations, the vendor systems 840. Vendor systems may include outside repositories. Vendor systems may also include government systems. The communication device 862 generally comprises a modem, server, or other device for communicating with other devices on the network 803. The user system 860 comprises computer-readable instructions 868, and data storage 869, stored in the memory device 866, which in one embodiment includes the computer-readable instructions 868 of a web browser or application 867 such as an application portal for accessing the permissions wizard module 817 running on the hub system 810. A user system 860 may refer to any device used to interact with the hub system 810, either from a user's perspective or vendor's perspective or both. In some embodiments, the user system 860 may refer only to a user's device, in other embodiments it refers only to a plurality or user devices, and in yet other embodiments, it refers to both a user device interacting with other devices to perform actions associated with the permissions wizard module and/or the sharing economy in general.

The user application 867 enables the user system 860 to be linked to the hub system 810 to communicate, via a network 803. Information related to the sharing economy, such as the immersive training content or listings, the vendor pages, user parameters, including permissions associated with various listings and the like may be accessed from the hub system and displayed on the user system 860, provided the authenticated user has access to such information.

The user application 867 may also receive information from the hub system 810. The user application 867, in some embodiments, may receive a requests for information from the permissions wizard module 817, such that the user application 867 may display the requests to the user 802 on a display on the user system 860. In this way, the user 802 may interact with the hub system 810 in order to run the permissions wizard module 817 for various listings.

FIG. 1 also illustrates a vendor system 840. The vendor system 840 may include a communication device 842, a processing device 844, and a memory device 846. The processing device 844 is operatively coupled to the communication device 842 and the memory device 846. The processing device 844 uses the communication device 842 to communicate with the network 803 and other devices on the network 803, such as, but not limited to the hub system 810, and in some configurations, the user systems 860. As such, the communication device 842 generally comprises a modem, server, or other device for communicating with other devices on the network 803.

As further illustrated in FIG. 1, the vendor system 840 may include computer-readable instructions 848, and data storage 849, stored in the memory device 846, which in one embodiment includes the computer-readable instructions 848 of a web browser or application 847 configured for accessing and/or interacting with the permissions wizard module 817 running on the hub system 810. The sharing economy 801 may contain numerous vendor systems 840.

FIG. 2 illustrates an exemplary process flow 200 for the utilization of a permissions wizard within a sharing economy. The process flow begins at block 210, where the sharing economy system receives a request to set permissions for a listing, where the listing contains content, or a link to content. A contributing user is defined as a user who is adding, or contributing, new content, or data, to the sharing economy. In some embodiments, the contributing user is the creator of the content. In some embodiments the contributing user is the uploader of the content. In some embodiments the contributing user is setting or re-setting permissions for a listing that has already been uploaded and/or published. Further, in some embodiments the contributing user updating a listing was not the original contributor but part of the same organization with permission to update the content listing.

Following the request from the contributing user, the process flow continues at block 220, where the system executes the permissions wizard module. The permissions wizard module is further described in FIG. 3. After the execution of the permissions wizard module, the system continues either to block 230A where the system receives confirmation to proceed with the results of the permission wizard module—a permission recommendation, or to block 230B where the system receives an indication from the contributing user to apply a Creative Common's License to the content. Following block 230A, the system continues to block 240A which includes assigning the permissions associated with the permissions recommendation from the permissions wizard module. Following block 230B, the system continues to block 240B which includes assigning permissions associated with the Creative Commons license indicated by the user. Once permissions have been assigned, according to either the permissions recommendation or the Creative Commons license, the system will continue to block 250, where the system will publish the new listing to the sharing economy with the assigned permissions. In some embodiments, if the contributing user does not approve the permissions recommendation, then the user may manually select certain permissions, such as specific Creative Commons licensing selected by the user, and then the permissions are assigned to the listing, which may published to the sharing economy, or saved for later.

FIG. 3 illustrates the process flow 300 for the execution of the permissions wizard module. The first step in the permissions wizard module is block 320, where the system accesses a predetermined permissions map from the memory device. The predetermined permissions map may be selected from a plurality of predetermined permissions maps. From here, the process will proceed to block 330 where the system may determine the contributing user's user type. The user type may be selected from a plurality of user types. Examples of user types include: government-type and non-government type (or contractor-type). The process will continue to block 340, where the system will identify and implement a workflow. The workflow may be selected from a plurality of workflows. The workflow may be dependent on the contributing user's user type. An exemplary workflow for a non-government-type user is illustrated in FIG. 4. An exemplary workflow for a government-type user is illustrated in FIG. 5. The process continues to block 350, where the system will identify the user's data security level. The process continues to block 360, where the system applies the predetermined permissions map to generate a permissions recommendation for the content, or new listing. After generating a permissions recommendation, the process flow continues to block 370, where the system displays the permissions recommendation to the contributing user. From here, at block 380, the system will request confirmation from the contributing user to proceed with the permissions recommendation. If the user chooses to proceed with the permissions recommendation, the process flow will continue at block 230A of the process flow represented in FIG. 2. In some embodiments, the contributing user may choose to manually set permissions. In other embodiments, the contributing user may select a Creative Commons license.

FIG. 4 illustrates an exemplary workflow 400, where the user type is a non-government-type. The contractor workflow begins at block 410, where the system launches the contractor-type workflow. In some embodiments, prior to block 420, the system will request information regarding the security of the data, whether it is unclassified or controlled unclassified information (CUI). In other embodiments, the system will request information regarding the security of the data after block 420. At block 420, the system will query the user whether the content was created under a government contract, as exemplified by the screenshot of the permissions wizard module in FIG. 8 If the user responds "yes" at block 420 the system will query the user about what type of contract it was at block 430, as exemplified by the screenshot of the permissions wizard module in FIG. 9. If it is of a pre-defined type (x-type), such as an SBIR contract, the system will query the user to assign the typical rights associated with x-type contracts, at block 440. If assigning typical rights, the system will generate a permissions recommendation for the user, at block 465. If, at block 420, the user responds "no" indicating that the content was not created under a government contract, the system will query the user as to the classification of the content at block 445. If the content is controlled unclassified information (CUI), the system will proceed to block 530 of FIG. 5. If the content is unclassified, the system will allow the user to customize the data rights, at block 450, as exemplified by the screenshot of the permissions wizard module in FIG. 9. In some embodiments, the system will request that the user choose all applicable Data Rights for the listing. These Data Rights include: unlimited rights, limited rights, restricted rights, SBIR data rights, government purpose rights, and specifically negotiated license rights. Customizing data rights may comprise: at block 450, querying the user about the classification of the content; at block 455, querying the user if the content is approved for release to non-US personnel. If the content is approved for non-US personnel, the system may query the user as to which country's personnel should have access to the content, at block 460. After which, the system may generate a permissions recommendation for the content, at block 465. If, at block 430, the user selects that the contract type was "other" the system will customize data rights, as shown at block 445. Customizing data rights may include steps 450, 455, and 460 as described above. After which, the system will generate a permissions recommendation for the content, at block 465. FIG. 10 shows an exemplary permissions recommendation for a listing with SBIR data rights. As shown in FIG. 11, the user is provided with the option to apply Creative Commons to the listing.

FIG. 5 illustrates an exemplary workflow 500, where the user type is a government-type. The government-type workflow begins at block 510, where the system launches the government-type workflow. At block 520, the system identifies the classification, or security level, of the content, as illustrated in the screenshot of the permissions wizard module in FIG. 12. If the content is Controlled Unclassified Information (CUI), the system will proceed to block 530, where the system will prompt the user to choose Limited Dissemination Control (LIMDIS) markings for the content, as illustrated in the screenshot from the permissions wizard module in FIG. 13. In some embodiments, the user may respond with one LIMDIS content marking. In other embodiments the user may respond with more than one LIMDIS content marking. Following receipt of the user's selected LIMDIS control marking, the system will continue to block 535, requesting details regarding the selected LIMDIS control, as illustrated in the screenshot from the permissions wizard module in FIG. 14. The system may request details regarding the controlling agency name, the contributing user's name and information, as well as the category of the content. In some embodiments, where the LIMDIS content marking dictates, the system may proceed to block 550. In other embodiments, where the LIMDIS content marking dictates, the system may proceed to block 570. In some embodiments, where the LIMDIS content marking dictates, the system may proceed to block 540 to allow the user to select an applicable distribution statement, as represented by the screenshot of the permissions wizard module in FIG. 15a. In some embodiments, the distribution statements presented to the user correlate to the DOD distribution statements, as previously described. In other embodiments, the distribution statements presented to the user correlated to another government agency's distribution statements. After receiving a selected distribution statement from the user, the system may proceed to block 550 based on the LIMDIS statement selection, where the system will query the user as to whether the content is approved to non-US personnel. If the user responds yes, the system will proceed to block 560 to query the user as to which countries can access this content, as illustrated in the screenshots from the permissions wizard module in FIG. 16. After which, the system will generate the permissions recommendation for the content, at block 570. If the user responds that the content is not approved for non-US, the system will proceed to block 560 where the system will generate the permissions recommendation for the content and present it to the user, as shown in the exemplary permission recommendation for a CUI workflow of FIG. 17a.

If, at block 520, the user responded that the content was unclassified, the system will proceed to block 530, where the system will prompt the contributing user to select an applicable distribution statement. An exemplary distribution statement request is illustrated in the screenshot in FIG. 15b. From here the system will proceed as described above to block 550 where the system will request if the content is approved for non-US personnel. If so, the system will request which countries may access the content at block 560. If not, the system will generate a permissions recommendation at block 570. An exemplary permissions recommendation for an unclassified workflow is illustrated in FIG. 17b.

FIG. 6 illustrates a process flow 600 for the utilization of a permissions wizard within a sharing economy when an accessing user logs in to discover a listing or content. First, at block 610, the system identifies the accessing user's user type. In some embodiments, the accessing user's user type is non-government or contractor type. In other embodiments, the accessing user's user type is government type. Alternatively, the accessing user's user type is public type. In other embodiments, the accessing user's user type is other or foreigner. At block 620, the system determines the accessing user's permissions for a listing. Following this determination, the system will display the listing the accessing user based on their permissions, at block 625. In some embodiments, the accessing user has Discover permissions for a listing, in this case the accessing user will see that the listing exists but will not have the ability to view additional information or see the content of the listing. In some embodiments, the accessing user has Download permissions for a listing, in this case the accessing user may download the content of the listing. Additionally, or alternatively, the accessing user may have Use permissions for the listing, in this case the accessing user may have the ability to use, display, and include the content of the listing in their applications or in the case of an application content listing type, login to the application. In some embodiments, the accessing user has Distribute permissions for a listing, in this case the accessing user may have the ability to use, display, and include the listing in other published listings or in the case of an application content listing type, share the application. In other embodiments, the accessing user may have Modify permissions for a listing, in this case the accessing user may make derivatives, modifications and alterations to the listing as well as use, display, and include the modified or remixed version of the content in other published listings.

In some embodiments, the system may, at block 630, provide the accessing user an opportunity to request further access to a listing. In response to this request, the system may, at block 635, enable the contributing user to alter the accessing user's permissions for the applicable listing. The permissions for a listing may be managed at a user level or at a group level, such as at a vendor or company level. For example, if a group of users all associated with a particular company should have similar permissions for a listing or set of listings, then the hub dashboard enables management of the permissions at the company level. Users may be classified into specific groups for management of the permissions in a collective fashion. Users can extensively modify the permissions on their listings at every level for individual users, users from a specific company or organization, or for users of a particular group or team. A contributing user may modify the permissions for a listing at any point. In some embodiments, the contributing user may modify the permissions based on a request from an accessing user, as described above.

As shown in the example in FIG. 18a and FIG. 18b, when a user type has no access to a listing, as is the case in this example for contractors or non-government users 1830 and public users 1810, a restricted symbol will be present to indicate that these types of users do not have any permissions for the listing. When a user type has full access to the listing, as is the case in this example for government users 1820 and the individual user logged into the system 1820, the symbol will be solid. As shown in the example in FIG. 19, if a user has limited permissions, as is the case in this example for government users 1820 and the logged-in user 1840, the symbol will be half-filled. In the example shown in FIG. 19, the logged-in user may see, download, use, and share the content, however they may not modify the content.

FIG. 20 is an exemplary representation of how a contributing user's view of a listings in the system. The listing user may modify 2010 the listing, this will trigger the system to run the permissions wizard to modify, or update, the permission settings for the listing. Additionally, as seen in FIG. 21, the user may add additional permissions to the listing by searching for a user's name, or group name, at 2110. FIG. 22 shows additional ways a listing user may edit the permissions of a listing. Permissions may be added for public users, government users, contractor users, and others. In some embodiments, the permissions for a listing cannot be made more restrictive, only expanded.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A hub system for use in a sharing economy, the hub system comprising a memory device for storing a permission wizard module and a processing device configured to:
  receive a request, from one or more contributing users, to set permissions for a listing in a sharing economy, wherein the listing comprises content, or a link to content;
  execute the permissions wizard module for the listing, wherein executing the permissions wizard module comprises:
    accessing, from the memory device, a predetermined permissions map;

determining, separately for each individual contributing user of the one or more contributing users, a user type that is selected from a plurality of user types, the plurality of user types for selection including a government user, a non-governmental user of an organization, a contractor of a governmental entity, and a public user;

identifying, based on the determined user type for each individual contributing user of the one or more contributing users, a workflow to implement for a respective contributing user of the one or more contributing users, wherein the workflow is selected from a plurality of predefined workflows that are specific to each of the plurality of user types and is previously linked to the user type;

implementing the identified predefined workflow for the respective contributing user, wherein implementing the identified workflow comprises requesting and receiving input from the respective contributing user;

applying the predetermined permissions map to generate a permissions recommendation;

displaying, to the respective contributing user, the permissions recommendation for the content; and requesting confirmation, from the respective contributing user, to proceed with the permissions recommendation.

2. The hub system of claim 1, wherein the processing device is further configured to:
receive confirmation, from the respective contributing user, to proceed with the permissions recommendation; and
assign permissions associated with the permissions recommendation to the listing.

3. The hub system of claim 1, wherein the permissions wizard module further comprises requesting, from the contributing user, a data security level of the content; and
wherein the processing device is further configured to assign the data security level to the listing.

4. The hub system of claim 1, wherein the processing device is further configured to:
receive, from the respective contributing user, input indicating that an identified Creative Commons license should be applied to the listing;
assign content permissions associated with the identified Creative Commons license to the listing.

5. The hub system of claim 1, wherein executing the permissions wizard module further comprises:
determining that the user type of a contributing user of the one or more contributing users is a contractor type such that the contributing user is one contractor of the governmental entity; and
requesting, from the contributing user, based on the contributing user's user type being a contractor type, whether the content was developed under a government contract.

6. The hub system of claim 5, wherein executing the permissions wizard module further comprises:
receiving user input from the contributing user that the content was developed under the government contract; and
requesting, from the contributing user, a contract type of the government contract the content was developed under, the contract type being a pre-defined type of government contract.

7. The hub system of claim 1, wherein a government user includes at least one of a DoD user and a user associated with a U.S. government agency wherein executing the permissions wizard module further comprises:
determining, from the user type, that a contributing user of the one or more contributing users is a government user;
requesting, from the contributing user, a data security level of the content; and
requesting, from the contributing user, an applicable distribution statement.

8. The hub system of claim 1, wherein executing the permissions wizard module further comprises:
determining that a contributing user of the one or more contributing users is a government user;
requesting, from the contributing user, a data security level of the content;
requesting, from the contributing user, applicable Limited Dissemination Control (LIMDIS) control markings as defined by U.S. government standards; and
requesting, from the contributing user, details regarding LIMDIS control.

9. The hub system of claim 1, wherein the processing device is further configured to:
receive a request, from a contributing user of the one or more contributing users, to modify permissions of a listing;
display, to the contributing user, the current permissions of the listing;
receive input from the contributing user, wherein the input comprises modifications to the permissions of the listing;
display modified permissions to the contributing user;
request confirmation of the modified permissions; and
assign, to the listing, the modified permissions.

10. The hub system of claim 1, wherein the processing device is further configured to:
identify an accessing user's user type;
check a listing for its predefined assigned permissions defined by a contributing user of the one or more contributing users to determine the accessing user's permissions for a listing; and
display, to the accessing user, the listing according to the accessing user's permissions for the listing.

11. The hub system of claim 10, wherein the processing device is further configured to:
provide, to the accessing user, an opportunity to request further access to the listing; and
upon receiving a request for further access to the listing from the accessing user, enable the contributing user is notified so that the contributing user can decide whether to alter the permissions for the listing.

12. The hub system of claim 1, wherein determining the user type comprises authenticating the user.

13. A method for assigning permissions to a listing within a sharing economy, wherein the method comprises:
receiving a request, from one or more contributing users, to set permissions for a listing in the sharing economy, wherein the listing comprises content, or a link to content;
executing a permissions wizard module for the listing, wherein executing the permissions wizard module comprises:
determining, separately for each individual contributing user of the one or more contributing users, a user type that is selected from a plurality of user types, the plurality of user types for selection including a government user, a non-governmental user of an organization, a contractor of a governmental entity, and a public user;

identifying, based on the determined user type for each individual contributing user of the one or more contributing users, a workflow to implement for a respective contributing user of the one or more contributing users, wherein the workflow is selected from a plurality of predefined workflows that are specific to each of the plurality of user types and is previously linked to the user type;

implementing the identified workflow for the respective contributing user, wherein implementing the identified workflow comprises requesting and receiving input from the respective contributing user;

applying a predetermined permissions map, based on the input received from the respective contributing user during the identified workflow;

presenting a permission recommendation, based on the predetermined permissions map, for the content to the contributing user; and requesting user confirmation of the permission recommendation from the respective contributing user.

14. The method for assigning permissions to a listing according to claim 13, further comprising:

receiving user confirmation of the permissions recommendation from the contributing user; and assigning permissions associated with the permissions recommendation to the listing.

15. The method for assigning permissions to a listing according to claim 13, wherein the permissions wizard module further comprises requesting, from the contributing user, a data security level of the content; and wherein the method further comprises assigning the data security level to the listing.

16. The method for assigning permissions to a listing according to claim 13, wherein executing the permissions wizard module further comprises:

receiving, from a contributing user of the one or more contributing users, input indicating that an identified Creative Commons license should be applied to the listing; and assigning permissions associated with the identified Creative Commons license to the listing.

17. The method for assigning permissions to a listing according to claim 13, further comprising:

determining an accessing user's permissions for the listing; and displaying, to the accessing user, the listing according to the accessing user's permissions for the listing.

18. The method for assigning permissions to a listing according to claim 17, further comprising:

providing, to the accessing user, an opportunity to request further access to the listing; and upon receiving a request for further access to the listing from the accessing user, enabling the contributing user to alter the accessing user's permissions for the listing.

19. The method of claim 13, wherein determining the user type comprises authenticating the user.

* * * * *